US012792488B2

United States Patent
Scerra

(12) United States Patent
(10) Patent No.: US 12,792,488 B2
(45) Date of Patent: Nov. 10, 2026

(54) MACHINE STATE RECORDER FOR SOFTWARE DIAGNOSTICS

(71) Applicant: Red Hat, Inc., Raleigh, NC (US)

(72) Inventor: Adam Christopher Scerra, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 178 days.

(21) Appl. No.: 18/240,172

(22) Filed: Aug. 30, 2023

(65) Prior Publication Data

US 2025/0077385 A1 Mar. 6, 2025

(51) Int. Cl.
*G06F 11/3604* (2025.01)

(52) U.S. Cl.
CPC ................................ *G06F 11/3604* (2013.01)

(58) Field of Classification Search
None
See application file for complete search history.

(56) References Cited

U.S. PATENT DOCUMENTS 9,703,694 B2 7/2017 Li et al.
10,521,331 B1 * 12/2019 Damodaran ........ G06F 11/3698
10,565,087 B2 * 2/2020 Mola .................. G06F 11/3612
11,188,420 B2 11/2021 Silverstein et al.
11,455,231 B2 9/2022 Beltran et al.
2015/0052406 A1 * 2/2015 Garrett ................ G06F 11/3636 714/45
2021/0081294 A1 3/2021 Golubev
2022/0229764 A1 7/2022 Zhai et al.
2023/0269082 A1 * 8/2023 Bruestle ................ H04L 9/3218 717/128
2023/0396502 A1 * 12/2023 Takeuchi ............ H04L 41/5048

FOREIGN PATENT DOCUMENTS

CN 110196812 B 2/2022

OTHER PUBLICATIONS

Henrik Thane, "Replay Debugging of Real-Time Systems Using Time Machines", IPDPS '03: Proceedings of the 17th International Symposium on Parallel and Distributed Processing (Year: 2003).*
Harshit Paul, "Are You Confused Between Scripting Testing and Record & Replay Testing?", Lambdatest, posted on Dec. 24, 2018, accessed on Aug. 30, 2023, 6 pages.
"Session Replay", Docs, accessed on Aug. 30, 2023.

* cited by examiner

*Primary Examiner* — Lewis A Bullock, Jr.
*Assistant Examiner* — Mark A Gooray
(74) *Attorney, Agent, or Firm* — Kilpatrick Townsend & Stockton LLP

(57) ABSTRACT

Systems, methods, and apparatuses for storing, presenting, and executing machine states during diagnostic software execution are provided herein. An example method comprises executing an application in a computing environment, periodically storing active states of the computing environment during the executing by creating a plurality of instances of the computing environment that correspond to the stored states, and presenting the stored active states in a linear interface that is configured to revert the computing environment to a respective stored active state by switching to a corresponding instance of the plurality of instances.

20 Claims, 5 Drawing Sheets

MACHINE STATE RECORDER FOR SOFTWARE DIAGNOSTICS

BACKGROUND

A significant portion of a typical software development timeline comprises a debugging process. Newly-created software seldom operates as intended on first execution, and will often fail to run to completion. Typically one or more timestamped logs will be provided summarizing any error(s) that occur during execution. A software developer will then usually analyze the logs to determine a cause of failure, then run the software again. At this point, the software will likely fail again, and the process is usually repeated until the software reaches an acceptable state of reliability.

SUMMARY

Systems, methods, and apparatuses are provided for storing, presenting, and executing machine states during diagnostic software execution. In an example, a method comprises executing an application in a computing environment, periodically storing active states of the computing environment during the executing by creating a plurality of instances of the computing environment that correspond to the stored states, and presenting the stored active states in a linear interface that is configured to revert the computing environment to a respective stored active state by switching to a corresponding instance of the plurality of instances.

In another example, a system includes a memory and a processing device, actively coupled to the memory, to execute an application in a computing environment, periodically store active states of the computing environment during execution by creating a plurality of instances of the computing environment that correspond to the stored states, and present the stored active states in a linear interface that is configured to revert the computing environment to a respective stored active state by switching to a corresponding instance of the plurality of instances.

In yet another example, a non-volatile computer-readable medium stores instructions which, when executed by a processing device, cause the processing device to execute an application in a computing environment, periodically store active states of the computing environment during execution by creating a plurality of instances of the computing environment that correspond to the stored states, and present the stored active states in a linear interface that is configured to revert the computing environment to a respective stored active state by switching to a corresponding instance of the plurality of instances.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter.

BRIEF DESCRIPTION OF THE DRAWINGS

The description will be more fully understood with reference to the following figures, which are presented as exemplary aspects of the disclosure and should not be construed as a complete recitation of the scope of the disclosure, wherein.

DETAILED DESCRIPTION

Figure 1:
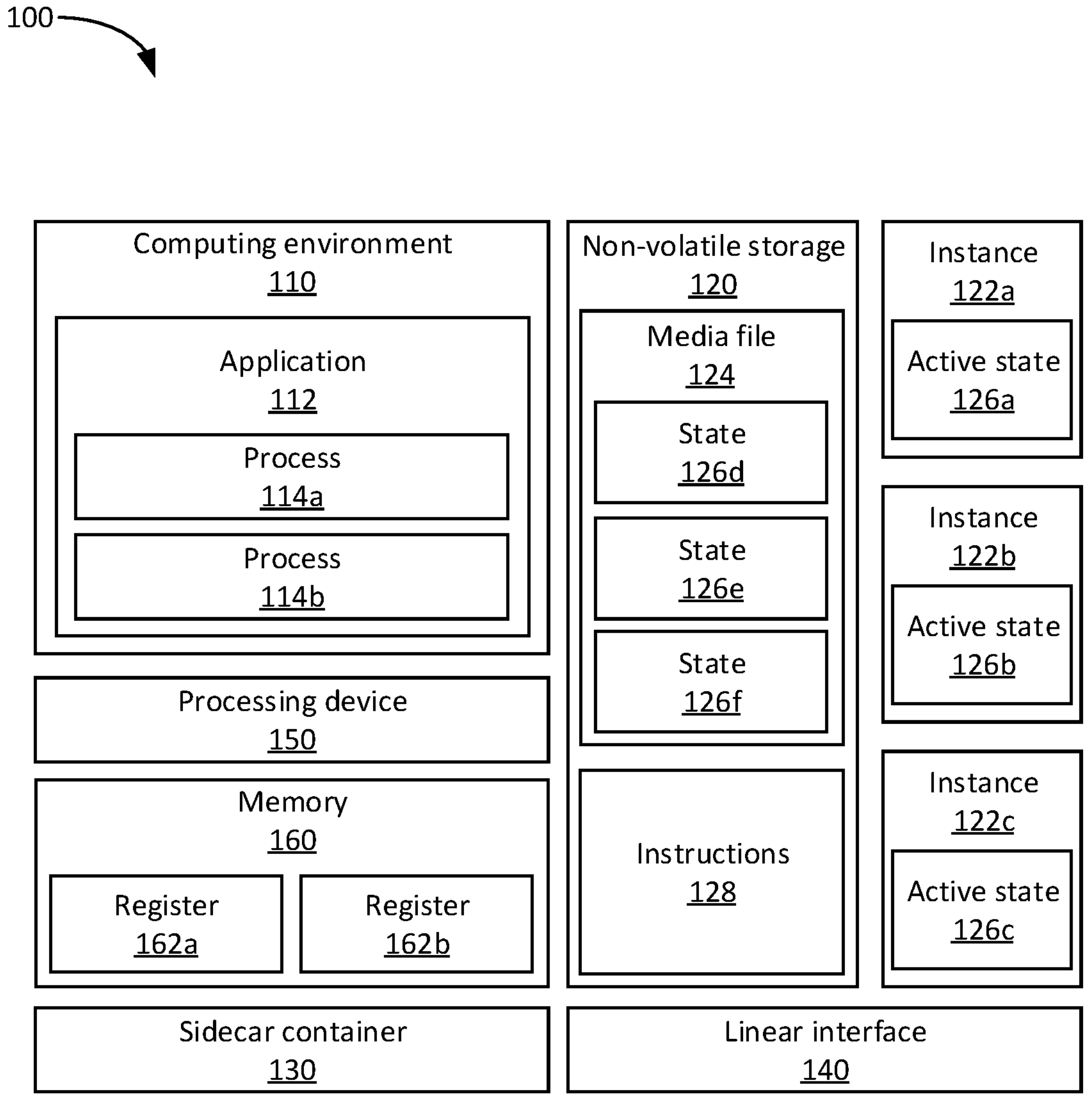
FIG. 1 illustrates an example system for storing, presenting, and executing machine states during diagnostic software execution, according to example embodiments of the present disclosure.

Techniques are disclosed herein for storing, presenting, and executing machine states during diagnostic software execution. As software, such as multi-product systems and services, becomes more complex, increasing challenges arise when attempting to diagnostically test the software, especially with automation. One of the most significant challenges when attempting to test such software is finding an exact moment when something went wrong. Timestamped logs are typically generated upon failure of an application, but inspecting the logs does not permit attempts to change a system state or fix an issue, as logs ultimately only help one to understand the issue. This results in countless hours spent by skilled developers analyzing logs to find issues, then trying various solutions for an issue so that another issue can be found and the process can begin anew, which in turn utilizes vast quantities of computational, memory, energy, and potentially network resources that could be put to a more productive use. It is therefore desirable to implement a system to allow for more rapid diagnosis of issues and exploration of solutions to those issues in order to decrease wasted power usage, hardware utilization, and human capital.

A snapshot of a system can be captured for later reversion of the system to a state that the system was in at the time of the snapshot. This capability is underutilized at present because navigating to and loading a snapshot into a system can be complicated and time-consuming, and rates of snapshot capture are generally low, minimizing a value of the capability. Solutions that do exist for capturing large volumes of snapshots during a test generally output these snapshots to a large data table that lacks context, and filtering through such a data table to find a desired snapshot can be as time consuming and difficult as analyzing a traditional log file.

Systems, methods, and apparatuses of the present disclosure record a diagnostic test of software in a similar manner to that of recording a video. A media file can be created which allows a user to scroll back to a time an error occurred and load or switch to an exact state of a system at that time (with same processes running, same software and dependencies installed, prior to a problematic event happening) in order to start testing a problematic application from a critical moment during execution. Starting from such a moment, a developer could implement a possible solution or modify a register in order to observe a result. If the possible solution does not produce an intended change, the user can simply scroll back to the critical moment and try another solution.

Taking snapshots of a machine state and storing them may act as the basis for such recording. A graphical user interface (GUI) can show progress of a test or system installation. Snapshot capture and screen capture can be combined into a media file, which may be opened in the GUI to allow a user to scroll through a timeline of snapshots, active instances, and screen captures. After a test has run and failed the user can open this media file and scroll to a point where an error occurred to load that snapshot or switch to that instance and begin diagnostic tests.

FIG. 1 illustrates an example system 100 for storing, presenting, and executing machine states during diagnostic software execution, according to example embodiments of the present disclosure. An application 112 with a first process 114*a* and a second process 114*b* executes within a computing environment 110 running on a processing device 150. The processing device 150 is operatively coupled to a memory 160 with a first register 162*a* and a second register 162*b*. A first instance 122*a* of the computing environment 110 with a first active state 126*a*, a second instance 122*b* with a second active state 126*b*, and a third instance 122*c* with a third active state 126*c* run on the processing device 150 parallel to but outside of the computing environment 110.

The first instance 122*a*, the second instance 122*b*, and the third instance 122*c* are active instances of the computing environment 110 that contain respective states already loaded into the memory 160. That is to say, the first instance 122*a*, the second instance 122*b*, and the third instance 122*c* are separate containers with execution paused, allowing the system 100 to rapidly switch from the computing environment 110 to one of the first instance 122*a*, the second instance 122*b*, and the third instance 122*c* responsive to user input. This is crucially distinct from a snapshot, which is merely a collection of data indicative of machine state, and can provide significant performance advantages over snapshots since a state need not be reloaded into the memory 160 to begin execution.

The processing device 150 is also in communication with a non-volatile storage 120 containing instructions 128 and a media file 124 which in turn contains a first stored state 126*d*, a second stored state 126*e*, and a third stored state 126*f*. It will be noted that a difference between an active state and a stored state is that the active state is already loaded into the memory 160 in a ready-to-execute instance of the computing environment 110, while a stored state is more similar to a snapshot in that the stored state is a collection of data in the non-volatile storage 120. The processing device 150 executes a sidecar container 130 for capturing and storing states of the computing environment 110, and a linear interface 140 allows a user to interact with the first instance 122*a*, the second instance 122*b*, the third instance 122*c*, and the media file 124.

Figure 2:
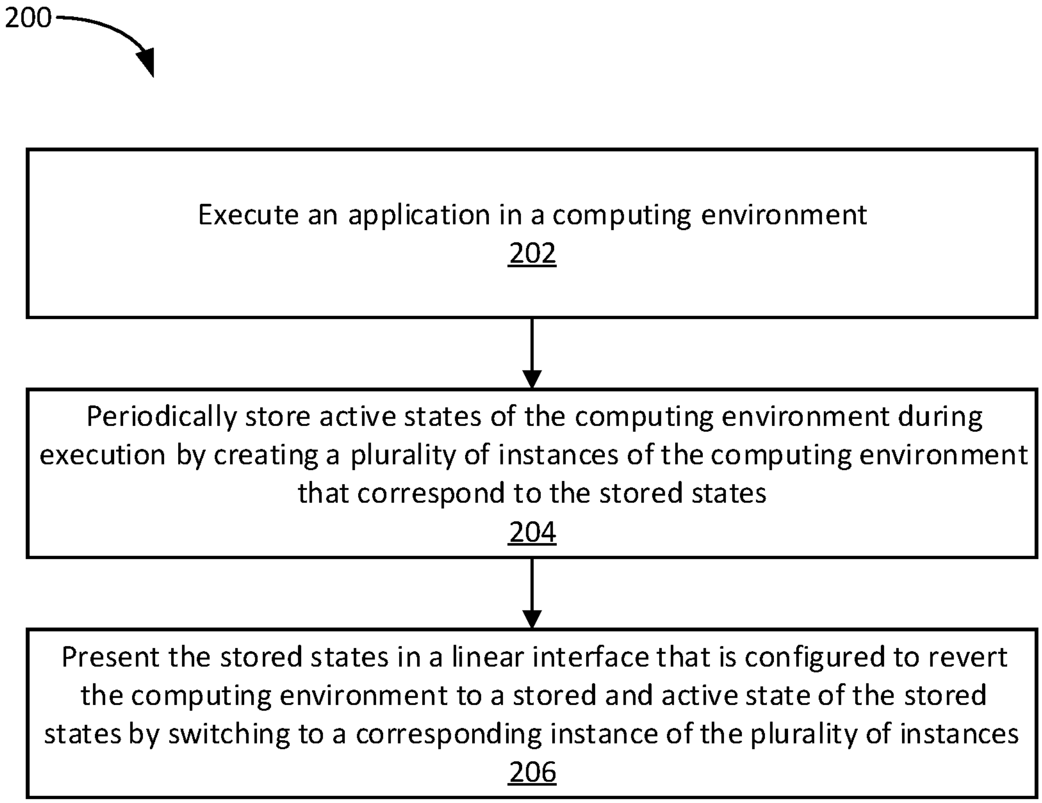
FIG. 2 illustrates an example method for storing, presenting, and executing machine states during diagnostic software execution, according to example embodiments of the present disclosure.

FIG. 2 illustrates an example method 200 for storing, presenting, and executing machine states during diagnostic software execution, according to example embodiments of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, one or more blocks may be repeated, and some of the blocks described are optional. The method 200 may be performed by processing logic that may comprise hardware (circuitry, dedicated logic, etc.), software, or a combination of both.

At block 202, an example processing device executes an application in a computing environment. For example, a processing device 150 may execute an installer for an operator on Openshift in a computing environment 110 for testing the installer.

At block 204, active states of the computing environment are periodically stored during the executing by creating a plurality of instances of the computing environment that correspond to the stored states. For example, a sidecar container 130 may perform a snapshot memory dump of the computing environment 110 every five clock cycles, create an instance of the computing environment 110 with each snapshot, then save each state to a non-volatile storage 120 for persistent storage. It will be appreciated that the sidecar container 130 may be configured to perform the snapshot memory dumps at any periodic rate, up to and including every clock cycle of the processing device 150. It will also be appreciated that performance tradeoffs may be present when capturing snapshots at higher rates, particularly when the sidecar container 130 executes on the processing device 150 rather than a separate processing device.

At block 206, the example processing device presents the stored active states in a linear interface that is configured to revert the computing environment to a respective stored active state by switching to a corresponding instance of the plurality of instances. For example, a graphical user interface (GUI) similar to that of a linear video editor may be provided, following a failure of the installer, by the processing device 150 via a display, allowing a user to scroll through a timeline of states captured at block 204. The GUI may provide information about a selected state (see FIG. 4) so that a user may view the timeline in greater context. The GUI may have a software button to allow execution of a selected state, and the processing device 150 may switch to an instance corresponding to a selected state and begin execution of the instance in place of the computing environment 110 responsive to a signal from the user (e.g. clicking a software button).

Figure 3:
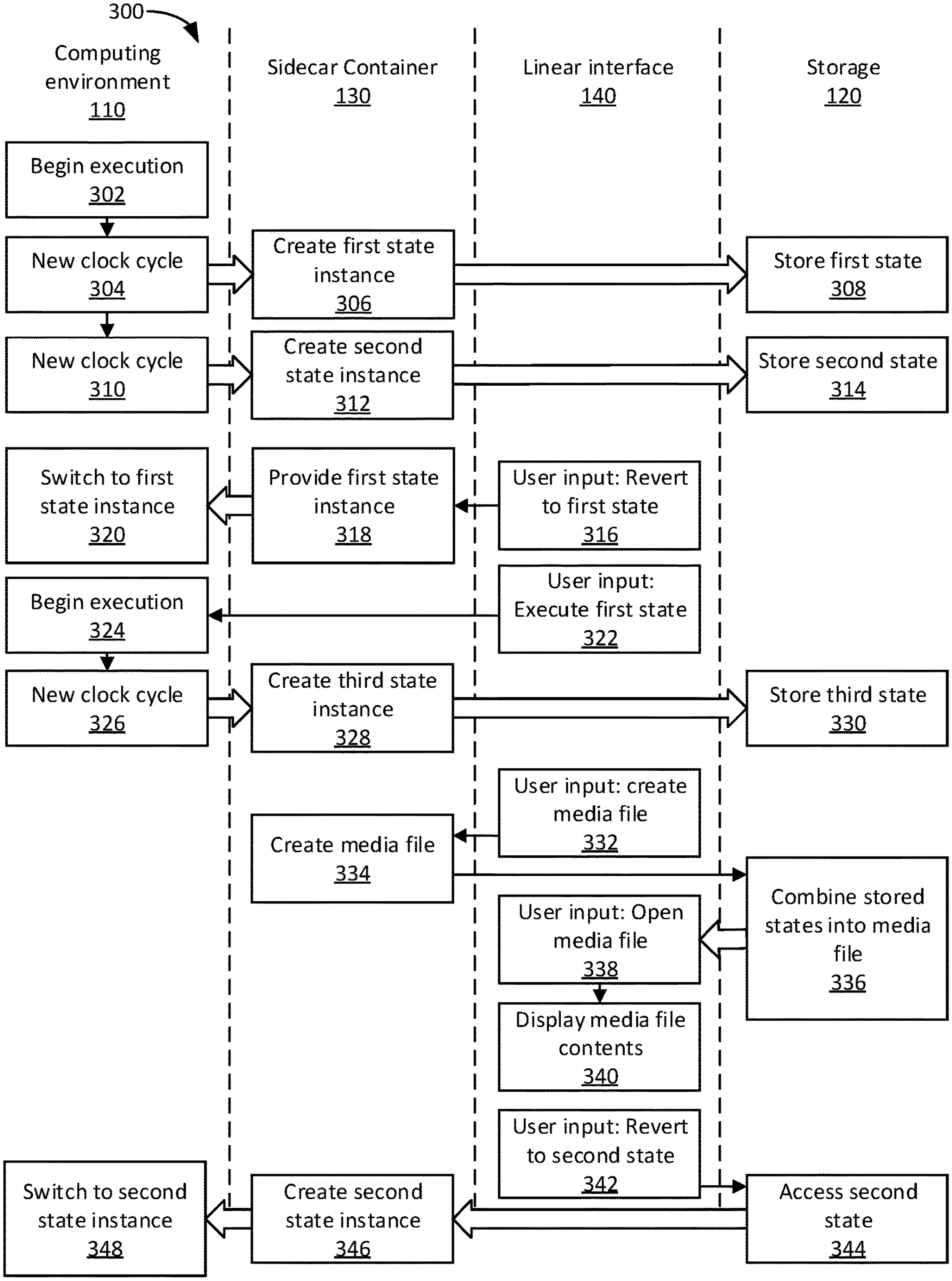
FIG. 3 illustrates a timing diagram for an example system for storing, presenting, and executing machine states during diagnostic software execution, according to example embodiments of the present disclosure.

FIG. 3 illustrates a timing diagram 300 for an example system for storing, presenting, and executing machine states during diagnostic software execution, according to example embodiments of the present disclosure. Although the example system is described with reference to the timing diagram 300 illustrated in FIG. 3, it will be appreciated that many other systems for and methods of performing the acts associated with the timing diagram 300 may be used. For example, the order of some of the blocks may be changed, certain blocks may be combined with other blocks, one or more blocks may be repeated, and some of the blocks described are optional. The acts associated with the timing diagram 300 may be performed by processing logic that may comprise hardware (circuitry, dedicated logic, etc.), software, or a combination of both.

A processing device 150 begins execution of a computing environment 110 (block 302) for testing a login request handler. A clock signal of the processing device 150 goes high (block 304), causing a sidecar container 130 executing on a sidecar processing device to record a first active state 126*a* of the memory 160 within a first instance 122*a* (block 306). The first active state 126*a* is sent to a non-volatile storage 120 as a first stored state 126*d* (block 308) for persistent retention.

The clock signal of the processing device 150 goes high a second time (block 310) and the sidecar container 130 creates a second instance 122*b* storing a second active state 126*b* (block 312). The second active state 126*b* is likewise sent to the non-volatile storage 120 as a second stored state 126*e* (block 314), and the computing environment 110 begins execution. Blocks 310 through 312 may repeat any arbitrary number of times, and may only be interrupted by a failure of the login request handler.

Following a conclusion of execution of the login request handler (whether by failure or by user intervention), the processing device 150 presents a linear interface 140 containing a scrollable timeline of states of the computing environment 110 to a user. The user selects a state (e.g. the first active state 126*a*) and clicks a "revert" software button (block 316) causing the sidecar container 130 to retrieve the first instance 122*a* of the computing environment 110. The sidecar container 130 then provides the first instance 122*a* to the processing device 150 which replaces the existing computing environment 110 with the first instance 122*a*, thereby making the first instance 122*a* the computing environment 110 (block 320).

The user then clicks a "start execution" button in the linear interface 140 (block 322), and the computing environment 110, having been replaced with the first instance 122*a*, begins execution from the first active state 126*a*. The clock signal of the processing device 150 goes high (block 326), and the sidecar container 130 creates a third instance 122*c* with a third active state 126*c* (block 328), which is sent to the non-volatile storage 120 for retention as a third stored state 126*f* (block 330). Execution of the computing environment 110 may once again continue for an arbitrary time, with a failure of the login request handler or user input causing a cessation of execution. The linear interface 140 may display a forked timeline, where subsequent executions from a particular state are displayed above or below an original timeline. The linear interface 140 may instead display only one timeline associated with the original execution or the new execution. This may be configurable by the user, with options provided, for example, for forked timelines, a new timeline only, or an old timeline only.

Following conclusion of execution of the computing environment 110, the user clicks a "create new file" software button (block 332) in the linear interface 140, causing the sidecar container 130 to create a media file 124 (block 334) in the non-volatile storage 120. The first active state 126*a*, the second active state 126*b*, and the third active state 126*c* are then combined in the media file 124 within the non-volatile storage 120 (block 336). The user then clicks an "open file" software button (block 338) in the linear interface 140, causing the linear interface 140 to display a timeline of the first active state 126*a*, the second active state 126*b*, and the third active state 126*c* from the media file 124 (block 340).

The user then selects the second active state 126*b* and clicks the "revert" button again (block 342), causing the sidecar container 130 to retrieve the second active state 126*b* from the non-volatile storage 120 (block 344). The sidecar container 130 then uses the second active state 126*b* to recreate the second instance 122*b* of the computing environment 110 (block 346). Finally, the sidecar container 130 then provides the second instance 122*b* to the processing device 150 which replaces the existing computing environment 110 with the second instance 122*b*, thereby making the second instance 122*b* the computing environment 110 (block 348). The user may then begin execution from the second active state 126*b*, and may continue to perform actions as described until an error is understood and/or a solution is found.

Figure 4:
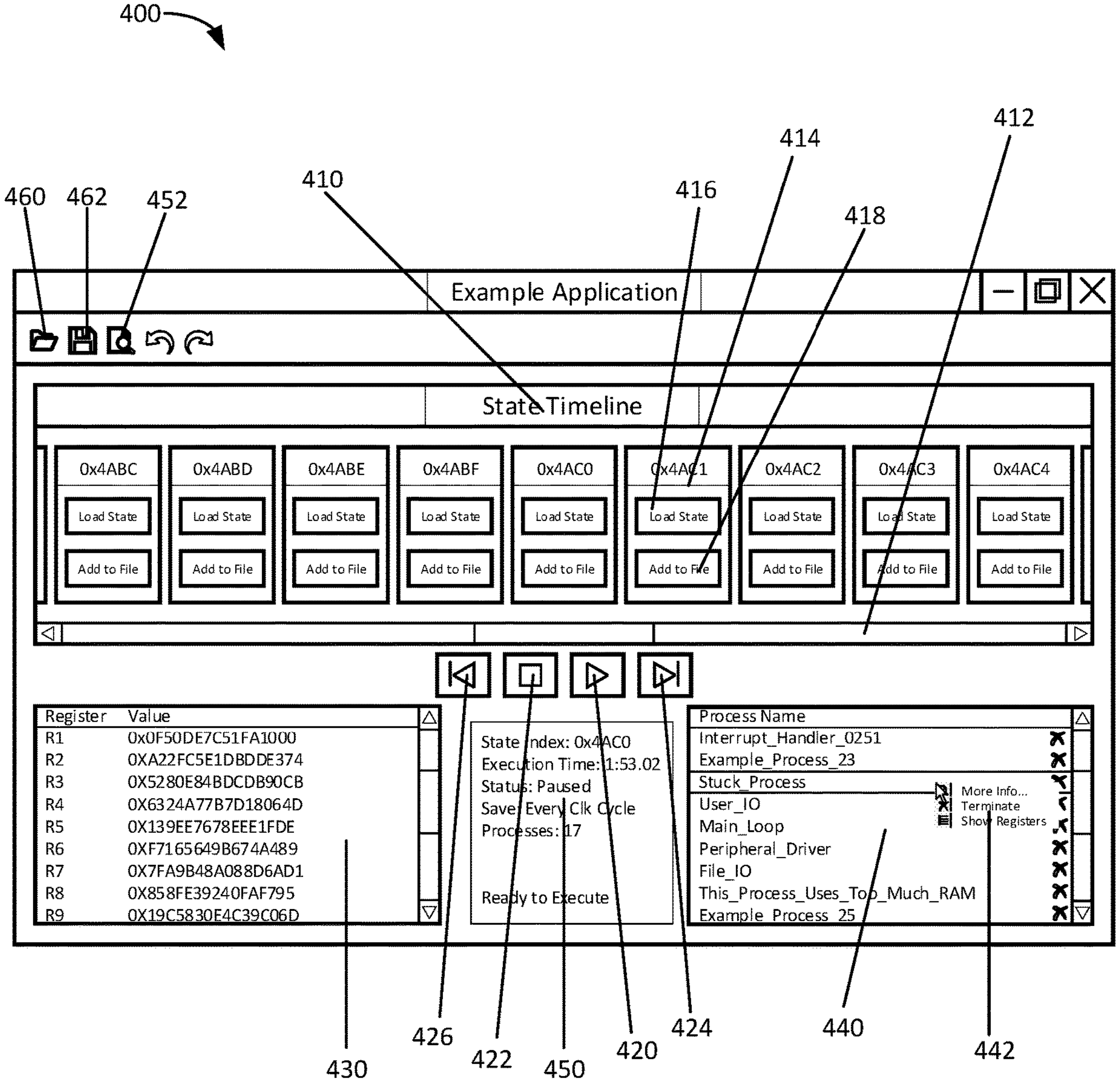
FIG. 4 illustrates an example linear interface, according to example embodiments of the present disclosure.

FIG. 4 illustrates an example linear interface 400, according to example embodiments of the present disclosure. Although the following description of the linear interface 400 is made with reference to FIG. 4, it will be appreciated that particular embodiments of the present disclosure may include additional elements and/or functionality of the linear interface 400 not illustrated and/or mentioned herein, and may exclude some of the discussed and/or illustrated elements and/or functionality.

The linear interface 400 is centered upon a state timeline 410, which allows a user to scroll via a scroll bar 412 or a mouse wheel through a plurality of states in chronological order. Each state of the plurality of states is represented in the state timeline 410 by a selectable state box 414 containing a name (or number) of a corresponding state, a "load" software button 416 allowing the user to revert to the corresponding state, and an "add to file" software button 418 allowing the user to add the corresponding state to a media file.

In a menu bar across a top of the linear interface 400 is an "open" software button 460 which allows the user to open an existing media file in the linear interface 400, a "save" software button 462 which allows the user to save one or more states to an open media file or to create a new media file, and a "search" software button 452 which allows the user to search through the timeline for a state with information matching a provided characteristic, such as a value in a given register. The menu bar may also include undo and redo software buttons in addition to other software buttons corresponding to additional features of the linear interface 400.

Directly below the state timeline 410 is a group of buttons for controlling execution of a selected state. A "step back" software button 426 allows the user to revert by a single saved state, and may be configured to revert by a fixed interval of states (e.g. five states). A "stop" software button 422 stops execution of a target computing environment, "freezing" the target computing environment. A "play" software button 420 begins execution of the target computing environment starting from a current state. A "step forward" software button 424 advances the target computing environment by one state, allowing for observation of execution in detail. Like the "step back" software button 426, the "step forward" software button 424 can be configured to advance the target computing environment by a fixed number of states.

A current state data display 450 presents data to the user about a current state of the target computing environment. This data may include a name or number of the state, an execution time of the state, a status of the target computing environment, a state save frequency, a number of processes running, and/or additional information. In some embodiments, the current state data display 450 instead displays data about a state currently selected in the state timeline 410. This may be user-configurable, and an option to simultaneously display information about both a current state and a selected state, with either both in the current state data display 450 or one in an additional display, may also be provided.

A register display 430 presents a scrollable list of registers of the target computing environment at a selected state along with a value of each register. Additional information, such as a time of last modification or a process of last modification of each register, for example, may be displayed here. This additional information may be recorded with each state or a software supporting the linear interface 400 may determine this additional information. For example, the software supporting the linear interface 400 may scan states in the state timeline 410 to determine a list of times that each register changes value, then employ this information to display a "last changed" time with each register for each state.

A process display 440 presents a scrollable list of processes executing within the target computing environment at a selected state. The user may right-click on a process in the process display 440 to access a drop-down menu 442. The drop-down menu 442 presents options to the user, which may include but are not limited to an option to display more information about the process (e.g. a purpose of the process), an option to terminate the process, and an option to show registers in use by the process. A similar drop-down menu may be accessed in relation to the register display 430, allowing the user to change a value of a register or display more information associated with that register.

It will be appreciated that particular embodiments may place or size elements of the linear interface 400 differently. In particular, the linear interface 400 may be implemented as a modular interface, allowing the user to resize, add, and subtract displays and elements as suits the user's particular workflow.

Figure 5:
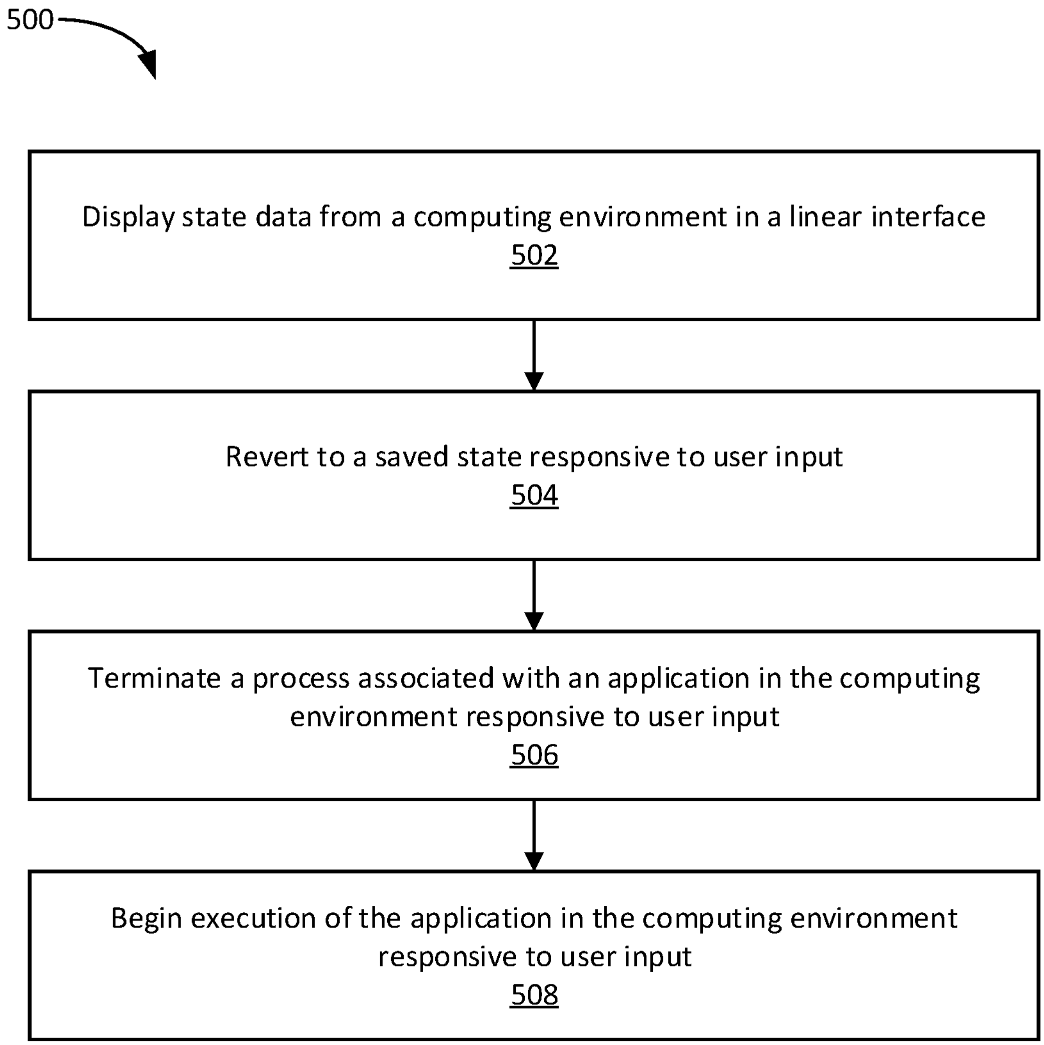
FIG. 5 illustrates an example method for allowing a user to select and execute a stored state, according to example embodiments of the present disclosure.

FIG. 5 illustrates an example method 500 for allowing a user to select and execute a stored state, according to example embodiments of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, one or more blocks may be repeated, and some of the blocks described are optional. The method 500 may be performed by processing logic that may comprise hardware (circuitry, dedicated logic, etc.), software, or a combination of both.

At block 502, an example processing device displays state data from a computing environment in a linear interface. For example, a user may open a media file 124 previously created to store states of a computing environment 110 for calculating tax data. A processing device 150 accesses a non-volatile storage 120 and retrieves data about a plurality of states stored in the media file 124. The processing device 150 may create a plurality of instances of the computing environment 110 corresponding to each state, allowing a user to quickly switch between the states. The processing device 150 then displays this data in a linear interface 140 (see FIG. 4).

At block 504, an example computing environment reverts to a saved state responsive to user input. For example, the user may click a software button indicative of a desire to switch to a first stored state **126*d*, causing the processing device 150 to substitute a first instance 122*a* containing a first active state 126*a*, corresponding to the first stored state 126*d*, in place of the computing environment 110. The computing environment 110 may become an instance corresponding to a selectable state in the linear interface 140**.

At block 506, the example processing device terminates a process associated with an application in the example computing environment responsive to user input. For example, the user may select a process **114*a* associated with a tax calculation application 112 within the first instance 122*a* (which is now the computing environment 110**) and click a software button indicative of a desire to terminate the selected process.

At block 508, the example processing device begins execution of the application in the example computing environment responsive to user input. For example, the user clicks a "play" software button, causing the processing device 150 to begin execution of the first instance **122*a* without the process 114*a* which was terminated at block 506. In this way the user can determine whether a problem with the tax calculation application 112 was a result of the process 114*a*** which was terminated.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as infrastructure processing units (IPUs), graphical processing units (GPUs), data processing units (DPUs), ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

What is claimed:

1. A method, comprising:

executing an application in a computing environment of a computer system;

while the application is executing in the computing environment, generating a plurality of instances of the computing environment based on different active states of the computing environment, wherein each instance of the plurality of instances is generated by copying a different active state of the computing environment into a corresponding container of a plurality of containers deployed in the computer system separately from the computing environment, wherein each instance of the plurality of instances of the computing environment has its execution paused within the corresponding container of the plurality of deployed containers, and wherein each instance of the plurality of instances of the computing environment is generated by loading a respective copy of a corresponding active state of the computing environment into memory of the corresponding container such that the instance is ready for execution within the corresponding container;

generating a linear interface identifying the plurality of instances of the computing environment;

presenting, for display on a user device, the linear interface; and based on receiving, via the linear interface, a selection of an instance of the plurality of instances of the computing environment from a user:

identifying, based on the selected instance, a particular container of the plurality of deployed containers associated with the selected instance, wherein the selected instance is in a paused state and ready for execution in the particular container; and executing the selected instance within the particular container, wherein the execution of the selected instance causes the computing environment to be executed within the particular container starting from the corresponding active state associated with the selected instance.

2. The method of claim 1, further comprising saving the different active states of the computing environment in a non-volatile storage medium, the saved active states being different from the plurality of containers.

3. The method of claim 2, further comprising saving the different active states of the computing environment to the non-volatile storage medium periodically to produce the saved active states.

4. The method of claim 2, further comprising saving the different active states of the computing environment responsive to a user input.

5. The method of claim 1, further comprising periodically storing the different active states for each clock cycle of the computing environment.

6. The method of claim 1, wherein the linear interface is configured to terminate a process associated with the application responsive to user input.

7. The method of claim 1, wherein the linear interface presents contents of one or more registers of the computing environment.

8. The method of claim 1, wherein a sidecar container is configured to store the different active states.

9. The method of claim 1, further comprising generating a media file based on the different active states, wherein media file is stored on a non-volatile memory device, and wherein the linear interface is configured to open the media file and display a timeline of the different active states identified in the media file.

10. The method of claim 9, wherein the media file further comprises screen captures, and wherein the linear interface is configured to display the screen captures.

11. The method of claim 9, wherein the media file includes a plurality of snapshots of the computing environment, the plurality of snapshots being different from the plurality of containers.

12. The method of claim 1, wherein the plurality of containers are different from snapshots.

13. A system, comprising:

a memory comprising instructions; and a processing device configured to execute the instructions to cause the processing device to perform operations including:

executing an application in a computing environment of a computer system;

while the application is executing in the computing environment, generating a plurality of instances of the computing environment based on different active states of the computing environment, wherein each instance of the plurality of instances is generated by copying a different active state of the computing environment into a corresponding container of a plurality of containers deployed in the computer system separately from the computing environment, wherein each instance of the plurality of instances of the computing environment has its execution paused within the corresponding container of the plurality of deployed containers, and wherein each instance of the plurality of instances of the computing environment is generated by loading a respective copy of a corresponding active state of the computing environment into memory of the corresponding container such that the plurality of instance is ready for execution within the corresponding container;

generating a linear interface identifying the plurality of instances of the computing environment;

presenting, for display on a user device, the linear interface; and based on receiving, via the linear interface, a selection of an instance of the plurality of instances of the computing environment from a user:

identifying, based on the selected instance, a particular container of the plurality of deployed containers associated with the selected instance, wherein the selected instance is in a paused state and ready for execution in the particular container; and executing the selected instance within the particular container, wherein the execution of the selected instance causes the computing environment to be executed within the particular container starting from the corresponding active state associated with the selected instance.

14. The system of claim 13, wherein the processing device is further configured to execute the instructions to cause the processing device to save the different active states of the computing environment in a non-volatile storage medium, the saved active states being different from the plurality of containers.

15. The system of claim 13, wherein the processing device is further configured to execute the instructions to cause the processing device to periodically store the different active states for each clock cycle of the computing environment.

16. A non-volatile computer-readable medium storing instructions which, when executed by a processing device, cause the processing device to perform operations including:

executing an application in a computing environment of a computer system;

while the application is executing in the computing environment, generating a plurality of instances of the computing environment based on different active states of the computing environment, wherein each instance of the plurality of instances is generated by copying a different active state of the computing environment into a corresponding container of a plurality of containers deployed in the computer system separately from the computing environment, wherein each instance of the plurality of instances of the computing environment has its execution paused within the corresponding container of the plurality of deployed containers, and wherein each instance of the plurality of instances of the computing environment is generated by loading a respective copy of a corresponding active state of the computing environment into memory of the corresponding container such that the plurality of instance is ready for execution within the corresponding container;

generating a linear interface identifying the plurality of instances of the computing environment;

presenting, for display on a user device, the linear interface; and based on receiving, via the linear interface, a selection of an instance of the plurality of instances of the computing environment from a user:

identifying, based on the selected instance, a particular container of the plurality of deployed containers associated with the selected instance, wherein the selected instance is in a paused state and ready for execution in the particular container; and executing the selected instance within the particular container, wherein the execution of the selected instance causes the computing environment to be executed within the particular container starting from the corresponding active state associated with the selected instance.

17. The non-volatile computer-readable medium of claim 16, further comprising instructions that are executable by the processing device for causing the processing device to periodically store the different active states for each clock cycle of the computing environment during execution of the application.

18. The non-volatile computer-readable medium of claim 16, wherein the linear interface is configured to terminate a process associated with the application responsive to user input.

19. The non-volatile computer-readable medium of claim 16, wherein a sidecar container is configured to generate the plurality of instances of the computing environment in the plurality of containers.

20. The non-volatile computer-readable medium of claim 16, further comprising instructions that are executable by the processing device for causing the processing device to perform the copying via a sidecar container.

* * * * *